(12) United States Patent
Kimura et al.

(10) Patent No.: US 6,674,858 B1
(45) Date of Patent: Jan. 6, 2004

(54) RECEIVING DEVICE, RECORDING AND REPRODUCING DEVICE AND RECEIVING/RECORDING-REPRODUCING SYSTEM FOR DIGITAL BROADCAST SIGNAL

(75) Inventors: Hiroyuki Kimura, Hiratsuka (JP); Takao Arai, Yokohama (JP); Toshifumi Takeuchi, Ota-ku (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/208,443

(22) Filed: Dec. 10, 1998

(30) Foreign Application Priority Data

Dec. 10, 1997 (JP) .............................................. 9-339635

(51) Int. Cl.⁷ .............................. H04N 7/167; H04L 9/00
(52) U.S. Cl. ...................... 380/202; 380/200; 380/239; 713/176; 713/193; 705/57
(58) Field of Search ....................... 705/57–58; 380/201, 380/203, 210, 217, 239–241; 713/176, 193

(56) References Cited

U.S. PATENT DOCUMENTS

| | | | | |
|---|---|---|---|---|
| 4,533,949 A | * | 8/1985 | Fujimura et al. | 380/201 |
| 5,138,659 A | * | 8/1992 | Kelkar et al. | 380/239 |
| 5,742,680 A | * | 4/1998 | Wilson | 380/227 |
| 5,778,064 A | * | 7/1998 | Kori et al. | 380/203 |
| 5,805,706 A | * | 9/1998 | Davis | 713/153 |
| 5,883,958 A | * | 3/1999 | Ishiguro et al. | 380/201 |
| 5,917,910 A | * | 6/1999 | Ishiguro et al. | 380/201 |
| 5,930,361 A | * | 7/1999 | Hayashi et al. | 380/210 |
| 5,949,881 A | * | 9/1999 | Davis | 713/189 |
| 5,978,479 A | * | 11/1999 | Ooi | 380/212 |
| 6,097,816 A | * | 8/2000 | Momiki et al. | 380/210 |
| 6,108,423 A | * | 8/2000 | Sako et al. | 380/203 |
| 6,128,605 A | * | 10/2000 | Saito et al. | 705/57 |
| 6,167,136 A | * | 12/2000 | Chou | 380/201 |
| 6,408,390 B1 | * | 6/2002 | Saito | 713/193 |

OTHER PUBLICATIONS

IEEE 100, The Authorative Dictionary of IEEE Standards Terms, seventh edition 2000, pp. 1220–1221.*
Frederick E Terman, Electronic and radio Engineering, 1955, McGraw Hill, Fourth edition, pp. 400–401.*

* cited by examiner

Primary Examiner—Gilberto Barrón
Assistant Examiner—Kambiz Zand
(74) Attorney, Agent, or Firm—Antonelli, Terry, Stout & Kraus, LLP

(57) ABSTRACT

A receiving device comprises a signal demodulator circuit for demodulating an encrypted video signal and attribute information including information for decoding an encryption, an attribute information identifying circuit for identifying and outputting the attribute information, and a descramble circuit for unscrambling the video signal obtained from the signal demodulator circuit, based on the output produced from the attribute information identifying circuit. A signal re-scrambled in accordance with a device ID signal is recorded in a recording and reproducing device. Further, the recording of the signal is controlled based on the output obtained from the attribute information identifying circuit.

5 Claims, 9 Drawing Sheets

RECEIVING DEVICE, RECORDING AND REPRODUCING DEVICE AND RECEIVING/RECORDING-REPRODUCING SYSTEM FOR DIGITAL BROADCAST SIGNAL

BACKGROUND OF THE INVENTION

1. Field of the Invention

The present invention relates to a digital broadcast signal receiving device for reproducing, recording, and recording and reproducing a video signal or an audio or voice signal or digital information transmitted through digital broadcasts in the form of superimposing of an encryption key or a copy control signal thereon, and a recording and reproducing device for the digital broadcast signal.

2. Description of the Related Art

A pay-television broadcast has means for scrambling a signal therefor and allowing only a receiver to decryption its scramble and is constructed so as to be capable of receiving the decrypted signal.

This type of scramble technique has been done in cable television or the like. However, the present technique has come into wider use as it comes to a digital broadcast using a satellite.

As conventional analog systems, there are known a line rotation system for replacing the front and back of analog video signal with each other for every scanning line at random and scrambling it, and a line permutation system for dividing a video signal into respective signals so that the screen is cut and divided in the horizontal direction and permuting the divided video signals in the vertical direction.

As the digital broadcast using the satellite began, a system for encrypting a signal itself has spread so as to make it more difficult to decrypt or decode the signal, without having to use such an analog system.

Thus, when such an encrypted pay broadcast is recorded, it is necessary to construct a system of such a type that a specific process is performed on the recording device side and the pay broadcast can be recorded only by the proper receiver or a pay-broadcast contractor.

A copy control system proposed from this point of view has not yet come into being. The present invention has been invented in consideration of this viewpoint.

SUMMARY OF THE INVENTION

An object of the present invention is to provide a proper receiver as the object with means for controlling recording.

An another object of the present invention is to provide a receiving device, a recording device, and a recording and reproducing device for a digital broadcast signal, wherein the recording device performs authenticating work between the recording device and the receiving device (hereinafter abbreviated as "STB: Set Top Box") in a pay broadcast thereby to confirm that a receiver is proper, followed by falling into a recording operation.

A further object of the present invention is to provide a receiving device, a recording device, and a recording and reproducing device wherein in order to perform encryption (scramble process) according to a device ID signal inherent in a receiver and determine even upon reproduction whether or not a recording medium is an illegally-copied recording medium, an attribute signal contained in a reproduced signal is detected and a reproducing operation is stopped according to the attribute signal.

According to one aspect of this invention, for achieving the above objects, there is provided a receiving device comprising a signal demodulator circuit for demodulating an encrypted video signal and attribute information including information for decoding an encryption, an attribute information identifying circuit for identifying and outputting the attribute information, and a descramble circuit for unlocking scrambling of the video signal obtained from the signal demodulator circuit according to the output obtained from the attribute information identifying circuit and wherein the output of the descramble circuit is outputted for recording. Further, the signal obtained from the attribute information identifying circuit is outputted to a recording device to perform copy control. There is also provided a re-scramble circuit for effecting re-scrambling on the descrambled video signal according to the attribute information obtained from the attribute information identifying circuit. In the receiving device, an electronic watermark processing circuit is provided and a CGMS signal obtained from the electronic watermark processing circuit is outputted to a recording device to control copying of the recording device. Further, in the receiving device, a device ID generating circuit for generating an intrinsic device ID signal is provided and a re-scramble circuit for effecting re-scrambling on the descrambled video signal according to the device ID signal obtained from the device ID generating circuit is provided. The attribute information identifying circuit includes an attribute information detection circuit for detecting attribute information, and an encryption key decoding circuit for decoding the encryption key detected by the attribute information detection circuit. The encryption key obtained from the output of the encryption key decoding circuit is supplied to the descramble circuit. The attribute information detection circuit detects a CGMS signal contained in the attribute information and outputs the same to a recording device as a copy control signal. The receiving device includes an MPEG decode circuit for decoding an MPEG-compressed video signal and a video encode circuit for converting the decoded video signal to a standard television signal. The receiving device includes a stream circuit for converting the re-scrambled signal to a stream and outputting the same therefrom. Further, a modem connected to a telephone line is provided and obtains the device ID signal through the telephone line.

According to another aspect of this invention, for achieving the above objects, there is provided a receiving device comprising a signal demodulator circuit for demodulating an encrypted video signal and attribute information, a signal processing circuit for unlocking an encryption of the demodulated signal, a re-scramble circuit for scrambling the encryption-set free video signal again, means for outputting the re-scrambled video signal to a recording device for recording, and an attribute information identifying circuit for outputting a copy control signal for inputting to the recording device. Further, the signal processing circuit outputs an analog television signal to a television receiver.

According to a further aspect of this invention, there is provided a receiving device comprising a signal demodulator circuit for demodulating an encrypted video signal and attribute information including each encryption key and each channel key indicative of a broadcast channel, a channel key detection circuit for detecting a channel key from the attribute information, an encryption key detection circuit for detecting an encryption key from the attribute information, a device ID generating circuit for generating an intrinsic device ID signal, a channel key selection circuit for selecting a channel key for a receivable channel according to the device ID signal and outputting the same therefrom, a decryption circuit (an encryption decoding circuit) for outputting a decryption key from the channel key outputted from the channel key selection circuit and the encryption key, a descramble circuit for unlocking scrambling of the video signal obtained from the signal demodulator circuit, based on the decryption key, and a re-scramble circuit for re-scrambling the descrambled video signal using the decryption key, and wherein the output of the re-scramble circuit is outputted for recording. In the present receiving device, a format conversion circuit is provided and performs format conversion for converting the descrambled video signal to a format which matches with a recording medium to record the video signal therein.

According to a still further aspect of this invention, for achieving the above objects, there is provided a recording and reproducing device comprising a recording and reproducing portion for recording a video signal scrambled in accordance with an intrinsic device ID signal, a device ID generating circuit for generating an intrinsic device ID signal, and a device ID detection/coincidence circuit for detecting a device ID signal contained in the recorded and reproduced video signal, making a decision as to the coincidence between the detected device ID signal and the device ID signal outputted from the device ID generating circuit, and allowing the passage of the reproduced video signal when they coincide with each other. Output means for supplying the output of the device ID generating circuit to a receiver for outputting a video signal scrambled according to an intrinsic device ID signal is provided. The recording and reproducing device includes a descramble circuit for releasing scrambling, an MPEG decode circuit for decoding an MPEG-compressed video signal and a video encode circuit for converting the video signal to a standard television signal.

According to a still further aspect of this invention, there is provided a recording and reproducing device comprising a recording and reproducing portion for recording a video signal scrambled according to an intrinsic device ID signal, a device ID generating circuit for generating an intrinsic device ID signal, and a descramble circuit for effecting descrambling on the video signal reproduced from the recording and reproducing portion using the device ID signal. The recording and reproducing device is provided with an MPEG decode circuit for decoding an MPEG-compressed video signal obtained from the descramble circuit, and an electronic watermark detection circuit for detecting electronic watermark information for performing copy control from the output of the descramble circuit and wherein upon copy prohibition, the MPEG decode circuit is deactivated according to the electronic watermark information.

According to a still further aspect of this invention, there is provided a recording and reproducing device comprising means for inputting therein an input signal including a video signal scrambled according to an intrinsic device ID signal, a device ID signal and updated copy control electronic watermark information, a device ID generating circuit for generating an intrinsic device ID signal, a descramble circuit for unscrambling the input signal by using the generated device ID signal, a recording and reproducing portion for recording the descrambled signal, an electronic watermark detection circuit for detecting the electronic watermark information from the descrambled signal, and means for controlling the recording of the recording and reproducing portion based on the electronic watermark information. The device ID signal obtained from the device ID generating circuit is supplied to the recording and reproducing portion where the present device ID signal makes coincidence with the device ID signal obtained from the descramble circuit, and when they coincide with each other, the recording of the recording and reproducing portion is allowed. Further, the output of the device ID detection/coincidence circuit is supplied to the MPEG decode circuit. Thus, when the device ID signals coincide with each other, the MPEG decode circuit is activated whereas when they do not coincide with each other, the MPEG decode circuit is deactivated. The recording and reproducing device is provided with a re-scramble circuit which re-scrambles the output of the MPEG decode circuit according to the device ID signal obtained from the device ID detection/coincidence circuit and outputs the re-scrambled output to another recording and reproducing device for recording.

According to a still further aspect of this invention, there is provided a receiving/recording-reproducing system comprising means for receiving an encrypted video signal and a signal including a decryption key related to the video signal, and a decryption circuit for decoding the video signal using the decryption key. The receiving/recording-reproducing system is provided with recording means for recording the video signal inputted thereto, and a control signal reading circuit for reading a control signal from the signal related to the video signal, whereby a recording operation of the recording means is controlled according to the control signal. Further, the receiving/recording-reproducing system is provided with an electronic watermark detection circuit for detecting electronic watermark information superimposed on the video signal and recorded, a decoding circuit for decoding the output of the decryption circuit, a format conversion circuit for converting the output of the decoding circuit to a format, and recording means for recording the output of the format conversion circuit therein, whereby the recording of the recording means is controlled according to the output of the electronic watermark detection circuit.

These and other objects, features and advantages of the invention will be apparent from the following more particular description of preferred embodiments of the invention, as illustrated in the accompanying drawings.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings.

DESCRIPTION OF THE PREFERRED EMBODIMENTS

Preferred embodiments of the present invention will hereinafter be described with reference to the accompanying drawings.

Figure 1A:
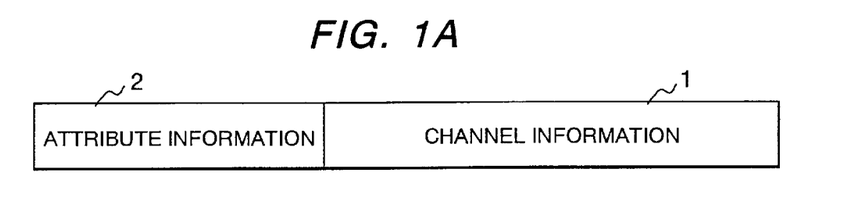
FIGS. 1A, 1B and 1C are respectively typical illustrations showing one embodiment of configurations of signals inputted to a receiving device according to the present invention.
Figure 1B:
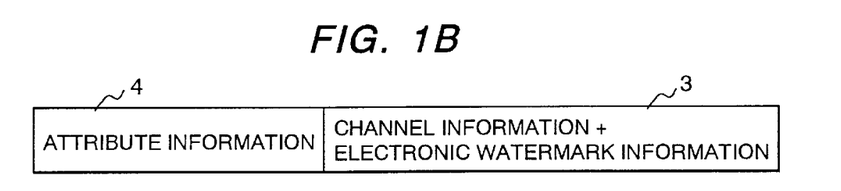
Figure 1C:
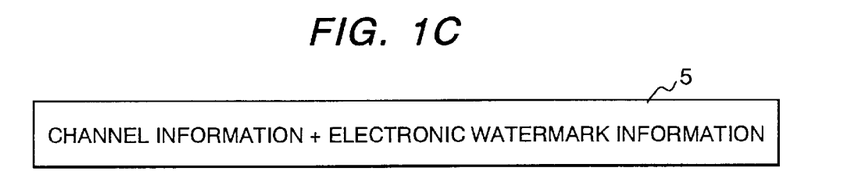

FIGS. 1A, 1B and 1C are respectively typical illustrations showing one embodiment of configurations of signals inputted to a receiving device according to the present invention. FIG. 1A shows the manner in which attribute information 2 is added to channel information 1 in accompanied form. An encryption key, a channel key, copyrighter information, etc. are contained as the attribute information 2. Channels normally indicate the numbers corresponding to transmit frequencies assigned to respective broadcasting stations, the names of other broadcasting stations, etc. Channel information indicates video information, voice information and other information which are broadcast through the channels.

FIG. 1B shows information 3 with electronic watermark information (watermark) related to programs such as a program copyright, copy management information (hereinafter called "a CGMS signal") being added thereto in the form of being electronically imbedded in channel information, and attribute information 4 in combination. The electronic watermark information is imbedded in a video signal by changing the brightness of the video signal. The copy management information, i.e., the CGMS signal is padded with information about copy disapproval (never copy), copy once approval (once copy) and freedom of copy (copy free). Since no control is necessary in the case of the copy free, the CGMS signal might not be imbedded in the channel information. The CGMS signal may be additionally provided inside the attribute information 4 aside from the watermark. Owing to the provision of the CGMS signal, when this signal coincides with the CGMS signal taken from the Watermark by determining whether both signals coincide with each other, recording is allowed, whereas whey they mismatch with each other, recording is not allowed.

FIG. 1C shows a signal 5 in which the attribute information shown in FIGS. 1A and 1B, i.e., in which the encryption key and device ID signals are electronically imbedded as electronic watermark information.

An STB and a recording device suitable for receiving and recording the signals shown in FIGS. 1A through 1C will be explained with reference to FIG. 2.

Figure 2:
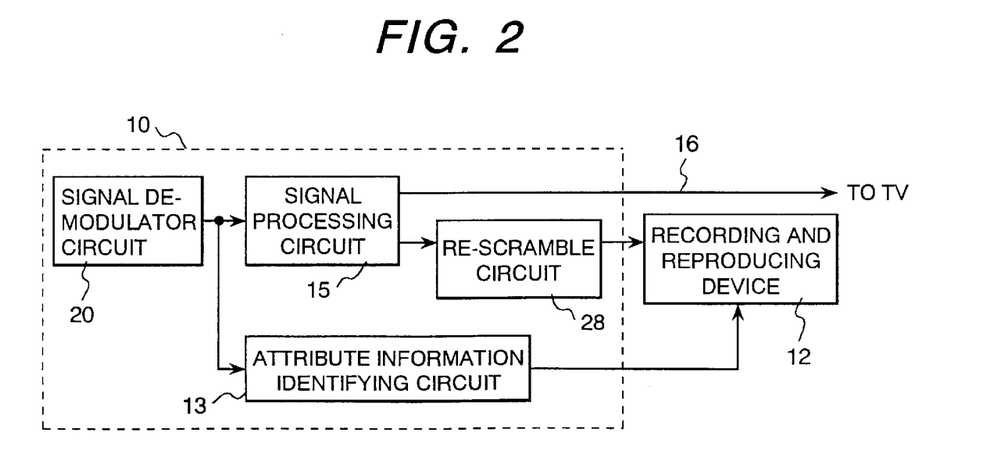
FIG. 2 is a schematic block illustrating embodiments of a receiving device and a recording device according to the present invention.

FIG. 2 is a block diagram schematically showing one embodiment of a receiving device and a recording device according to the present invention. In the drawing, reference numeral 10 indicates an STB for receiving signals broadcasted to many and unspecified persons. The STB 10 comprises a signal demodulator circuit 20, a signal processing circuit 15, an attribute information identifying circuit 13 and a re-scramble circuit 28. A television signal represented in analog form is outputted to a television receiver (not shown) through an output terminal 16 of the signal processing circuit 15. Further, the output of the signal processing circuit 15 is supplied to the re-scramble circuit 28 where it is scrambled before being recorded by a recording and reproducing device 12. A signal outputted from the re-scramble circuit 28 is supplied to the recording and reproducing device 12. Further, whether or not recording can be done by the recording and reproducing device 12, is controlled according to a signal outputted from the attribute information identifying circuit 13. The attribute signal identifying circuit 13 fetches only attribute information from a signal outputted from the signal demodulator circuit 20 and decodes information about programs such as an encryption key, a channel key, a program copyright, a CGMS signal, etc. all recorded therein so as to control the recording and reproducing device 12. Further, the attribute signal identifying circuit 13 fetches the electronic watermark information from the signal processing circuit 15 and performs copy control of the recording and reproducing device 12 using the fetched signal.

Figure 3:
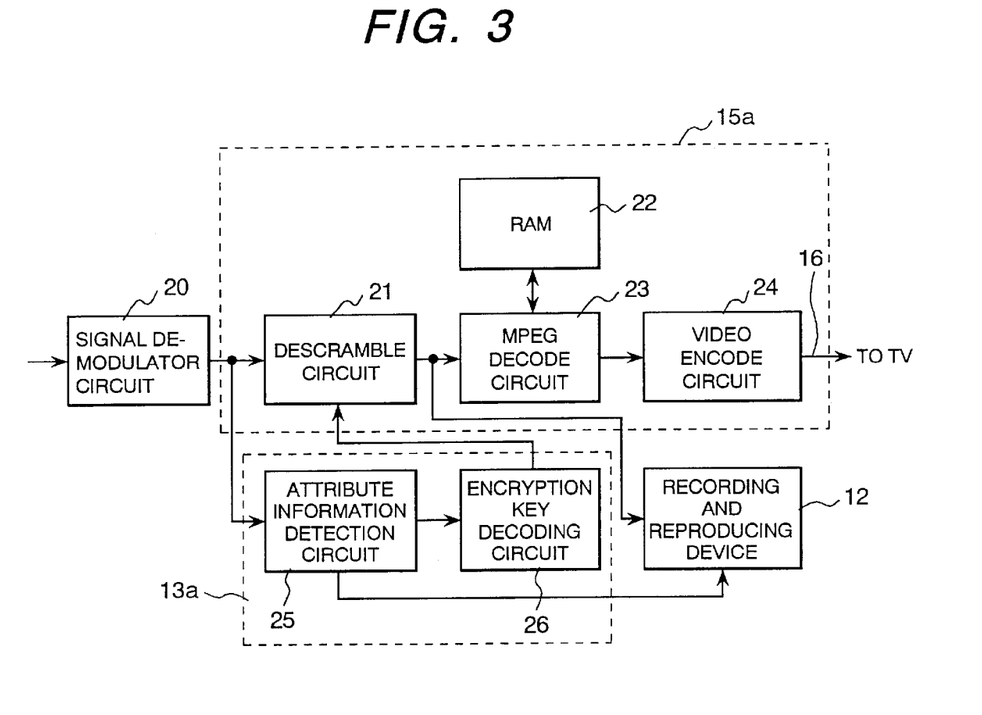
FIG. 3 is a block diagram depicting other embodiments of a receiving device and a recording device according to the present invention.

FIG. 3 is a block diagram showing other embodiments of a receiving device and a recording device according to the present invention. In the drawing, a signal processing circuit 15a comprises a descramble circuit 21, an MPEG decode circuit 23, a random access memory 22 (hereinafter called a "RAM 22") for temporally buffering image data for signal processing, and a video encode circuit 24. An attribute information identifying circuit 13a consists of an attribute information detection circuit 25 and an encryption key decoding circuit 26. The descramble circuit 21 performs crypto decoding on a signal demodulated by a signal demodulator circuit 20 using a predetermined decoding or decryption key or an encryption key in the present embodiment. The MPEG decode circuit 23 decodes a descrambled MPEG signal. The video encode circuit 24 encodes a standard video signal of NTSC or PAL or the like from the MPEG-decoded signal. The standard video signal is supplied to the television receiver (hereinafter called simply "TV").

A received digital broadcast signal is demodulated by the signal demodulator circuit 20 and the attribute information detection circuit 25 detects attribute information. The attribute information is supplied to the encryption key decoding circuit 26 where an encryption key related to the scramble is taken out. The encryption key is supplied to the descramble circuit 21 so that the scrambling of the received signal is unlocked or released. Further, the attribute information detection circuit 25 detects a CGMS signal contained in the attribute information. The CGMS signal is supplied to the recording and reproducing device 12, which in turn controls based on this signal whether the present-receiving television signal can be recorded. As distinct from the block diagram shown in FIG. 2, the descrambled signal is directly inputted to the recording and reproducing device 12 where it is determined based on the output of the attribute information detection circuit 25 whether the signal recording can be performed. If it is determined that the signal recording is allowed, then the recording and reproducing device 12 performs the signal recording.

In the block diagram shown in FIG. 3, the taken-out encryption key is inputted to the descramble circuit 21 and the output obtained from the signal demodulator circuit 20 is decoded or decrypted. However, when the video signal is supplied to the recording and reproducing device 12, the video signal may be encrypted using a device peculiar code imbedded in the STB 10, i.e., a device ID signal. In the recording and reproducing device 12, a decoding circuit thereof is used to decrypt and reproduce the encrypted signal. Further, a video encode output circuit provided within the recording and reproducing device 12 encodes the video signal and outputs the encoded signal to the TV, and is recorded by the recording and reproducing device 12.

Figure 4:
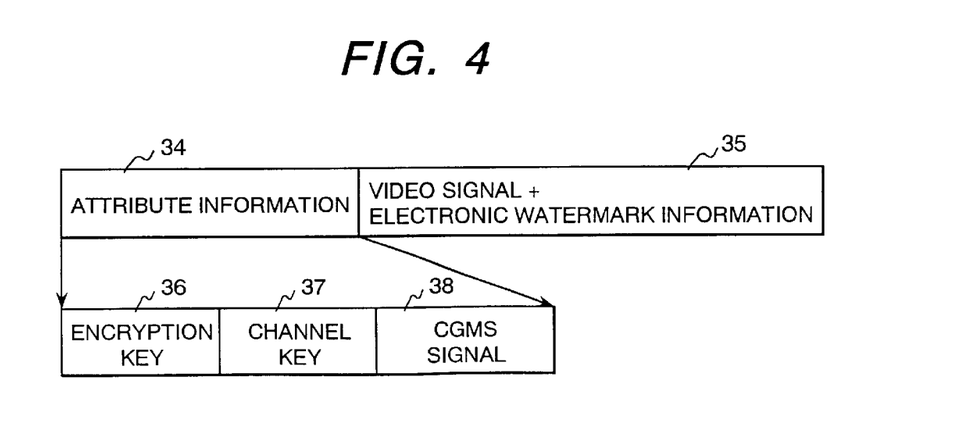
FIG. 4 is a typical illustration showing one embodiment of attribute information according to the present invention.

FIG. 4 is a typical illustration showing one embodiment of attribute information according to the present invention. In the drawing, outline signals supplied to the signal demodulator circuit 20 of the STB 10 include attribute information 34, a video signal and electronic watermark information 35 imbedded in the video signal, etc. Although many signals such as a voice signal, a synchronizing signal, etc. are inputted in addition to these, they are omitted from the drawing because they have no direct bearing on the present invention. The attribute information 34 includes an encryption key 36, a channel key 37 and a CGMS signal 38 or the like for unlocking or canceling the scrambling. In the CGMS signal, "00", means copy free, "10" means copying-once approval, and "11" means prohibition against any more copies.

When the CGMS signal is given as "10" and is represented as copyable once, the CGMS signal is changed to "11" simultaneously with a copy operation and it is necessary to indicate the execution of copying. In FIG. 3, the attribute information detection circuit 25 detects the CGMS signal and outputs a control signal for allowing copying to the recording and reproducing device 12 so far as "10" and "00" are taken. When the CGMS signal is given "00",it is not necessary to change the signal. However, when "10" is taken, the attribute information detection circuit 25 makes it impossible to perform copying beyond this with the CGMS signal as "11". The CGMS signal taken out of the attribute information detection circuit 25 is supplied to the recording and reproducing device 12 and is recorded into the recording and reproducing device 12 again through the descramble circuit 21 to record the next generation in the recording and reproducing device 12 through the descramble circuit 21.

Figure 5:
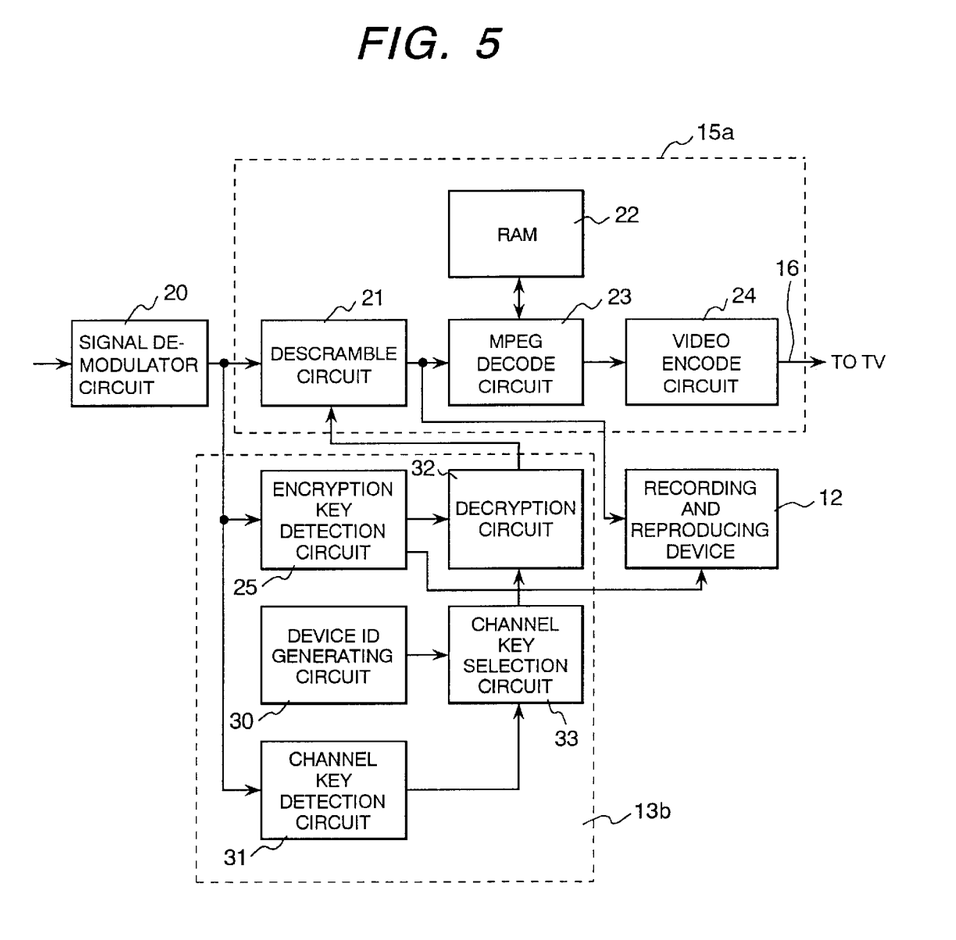
FIG. 5 is a block diagram illustrating further embodiments of a receiving device and a recording device according to the present invention.

FIG. 5 is a block diagram showing further embodiments of a receiving device and a recording device according to the present invention. In the drawing, blocks having the same functions as those in FIG. 3 are identified by the same reference numerals. In the present embodiments, an attribute information identifying circuit 13b comprises an encryption key detection circuit 25, a device ID generating circuit 30, a channel detection circuit 31, a decryption circuit (an encryption decoding circuit) 32 and a channel key selection circuit 33. In the present embodiment, a received signal is scrambled by using an encryption key and a channel key. An example in which a release or unlock key for unlocking the scrambling of this signal is obtained, will be explained with reference to the attribute information identifying circuit 13b.

In the drawing, a signal outputted from a signal demodulator circuit 20 is supplied to the encryption key detection circuit 25 and the channel key detection circuit 31. The device ID generating circuit 30 detects a device ID signal inherent in a regenerative or reproducing device. Further, the channel key detection circuit 31 detects a channel key for identifying each received channel. The device ID signal and the channel key are inputted to the channel key selection circuit 33, which selectively determines based on the device ID signal whether a channel desired to receive belongs to a contracted channel. When the received channel corresponds to the contracted channel, the channel key is supplied to the decryption circuit 32. The encryption key detection circuit 25 detects the encryption key from the output of the signal demodulator circuit 20 and supplies it to the decryption circuit 32. When the channel key corresponds to the encryption key, the description circuit 32 outputs a decryption key through its output and supplies it to the descramble circuit 21 where the scramble is unlocked or released. When the signal unlocked from scrambling is recorded by a recording and reproducing device 12, the recording of the signal into the recording and reproducing device 12 is controlled based on the encryption key outputted from the encryption key detection circuit 25. Thus, the provision of the plural keys makes it more difficult to perform illegal reproduction, thus makes it possible to block illegal recording. The present embodiments can be designed so as to offer more resistance to illegal copying operations by using a plurality of keys in this way and changing the length of each key, for example, by assigning a long key to its corresponding device ID signal and assigning a short key to its corresponding channel key, and changing keys for every channels and sending the same.

Figure 6:
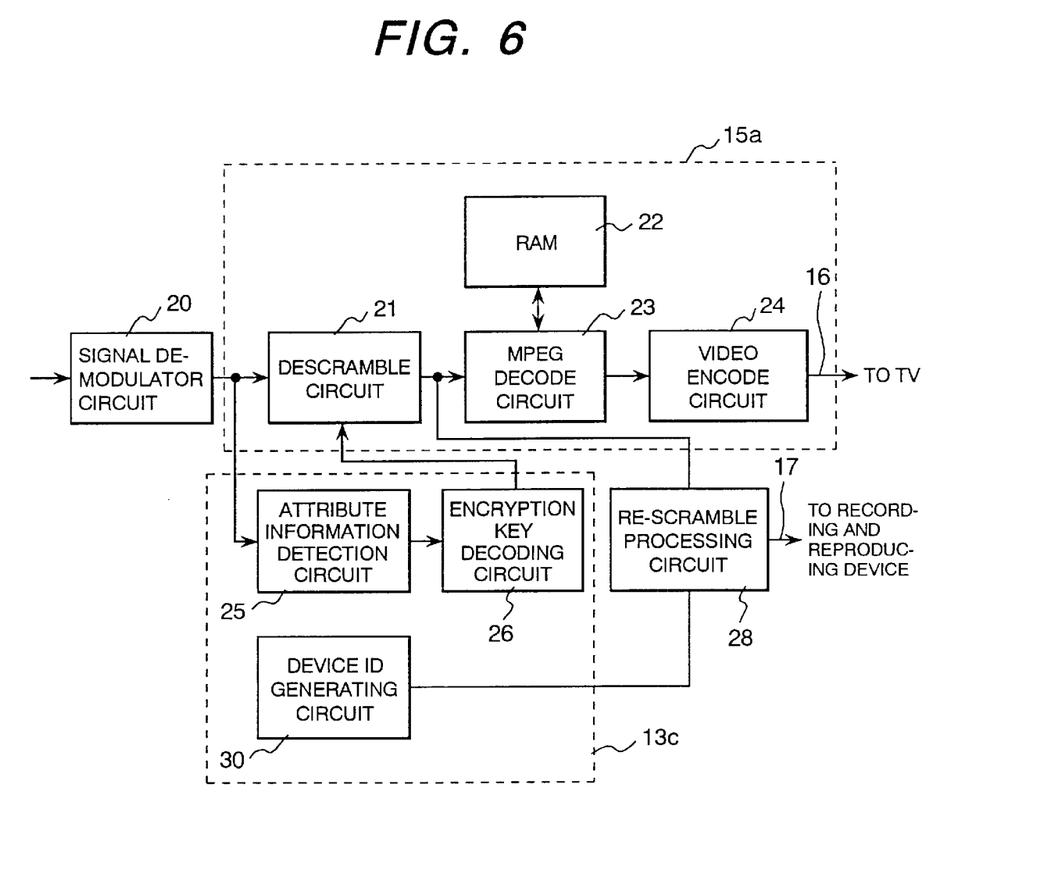
FIG. 6 is a block diagram depicting a still further embodiment of a receiving device according to the present invention.

FIG. 6 is a block diagram showing a still further embodiment of a receiving device according to the present invention. In the drawing, blocks having the same functions as those shown in FIGS. 3 and 5 are identified by the same reference numerals. An attribute signal detection circuit 13c comprises an attribute information detection circuit 25, a device ID generating circuit 30 and an encryption key decoding circuit 26.

In the present embodiment shown in FIG. 6, the attribute information detection circuit 25 detects an encryption key. Since the detected encryption key is converted by the changing of bits, a matrix arithmetic operation, etc., the encryption key decoding circuit 26 decodes it to obtain an encryption key and supplies the resultant key to a descramble circuit 21 where the scrambling of a signal received from a broadcast wave or the like outputted from a signal demodulator circuit 20 is released or unlocked. The signal unlocked by the descramble circuit 21 is converted to a video signal by an MPEG decode circuit 23. Further, a video encode circuit 24 converts the output of the MPEG decode circuit to a standard analog video signal, which in turn is outputted to the TV through a terminal 16. On the other hand, it is not preferable to descramble a digital signal and thereafter output it directly to a recording and reproducing device in terms of copy management. Therefore, the descrambled video signal is scrambled by a re-scramble circuit 28. Further, the re-scramble circuit 28 is supplied with a device ID signal assigned inherently to the device from the device ID generating circuit 30. Afterwards, the re-scramble circuit 28 performs scramble processing on this video signal again based on the device ID signal and outputs the so-processed signal to the recording and reproducing device (not shown) through a digital terminal 17.

While the device ID signal inherent in the device is used upon the re-scramble processing in the present embodiment, the present invention is not limited to this. The re-scramble may be performed by a CGMS signal or a channel key or the like contained in attribute information, for example. A re-scramble process may be performed with a complex signal comprised of attribute information and a device ID signal as an encryption key.

Figure 7:
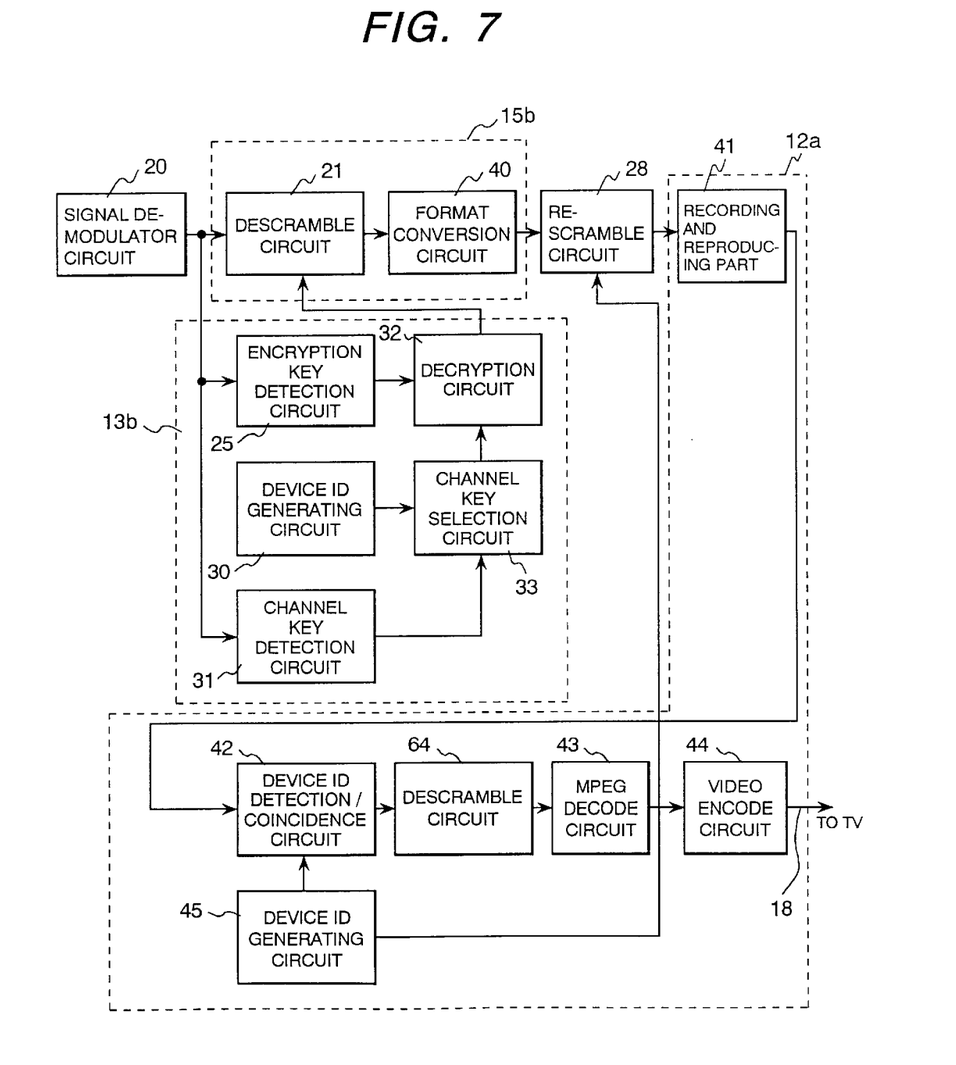
FIG. 7 is a block diagram showing still further embodiments of a receiving device and a recording and reproducing device according to the present invention.

FIG. 7 is a block diagram showing still further embodiments of a receiving device and a recording and reproducing device according to the present invention. Blocks having the same functions as those shown in FIG. 5 are identified by the same reference numerals. Since an attribute information identifying circuit 13b shown in FIG. 7 is identical to that shown in FIG. 5 and has been already described, the description thereof will be omitted.

In the drawing, reference numeral 40 indicates a conversion circuit for converting an descrambled signal into a format. Namely, there are known various types such as a RAM, a video tape, an optical disk, a magnetic disk, etc. as recording media for a recording and reproducing part 41. It is however necessary to convert the signal to a signal fit to a recording format corresponding to each recording medium and record it. The format conversion circuit 40 converts the descrambled signal into its corresponding format so as to match with a recording format. The signal whose format has been converted is re-scrambled by a re-scramble circuit 28. Upon re-scrambling, a device ID signal outputted from a device ID generating circuit 45 provided within a recording and reproducing device 12a is used. The re-scrambled signal is recorded by the recording and reproducing part 41.

The recording and reproducing device 12a comprises the recording and reproducing part 41 for reproducing the recorded signal, a device ID detection/coincidence circuit 42, a descramble circuit 64, an MPEG decode circuit 43, a video encode circuit 44 and a device ID generating circuit 45. The device ID detection/coincidence circuit 42 detects a record code, i.e., a device ID signal used upon execution of re-scrambling from a signal reproduced from the recording and reproducing part 41 and makes a coincidence between the device ID signal and a device ID signal reproduced by the device ID generating circuit 45. When the device ID signal contained in the reproduced signal outputted from the recording and reproducing circuit 41 coincides with the device ID signal obtained from the device ID generating circuit 45, the reproduced signal passes through the device ID detection/coincidence circuit 42 and is thereafter supplied to the descramble circuit 64. Further, the reproduced signal is supplied to the MPEG decode circuit 43 where it is decoded, followed by conversion into a standard television signal of NTSC or PAL or the like by the video encode circuit 44, which in turn is outputted to a TV (not shown) through an output terminal 18.

In the present embodiment, the coincidence between the device ID signal recorded by and generated from the recording and reproducing device 12a is made when a signal recorded on a recording medium such as a tape, a disk or the like is reproduced. The present embodiment is constructed so as to be capable of reproduction only when the device ID signal in the reproduced signal and the generated device ID signal have coincided with each other.

Owing to such a construction, the recording medium can be prevented from being reproduced by another recording and reproducing device.

In the present embodiment as described above, even when the signal is reproduced from the recording and reproducing device 12a, the reproduction is controlled based on the attribute information, i.e., the device ID signal recorded on the recording medium, whereby the broadcast signal can be recorded only by the device having the right to receive it in advance and reproduced only by the limited device used for recording.

Incidentally, the device ID signal is inputted to the re-scramble circuit 28 in the present embodiments. However, the device ID signal may be supplied to the format conversion circuit 40 so that encryption is effected on it.

Figure 8:
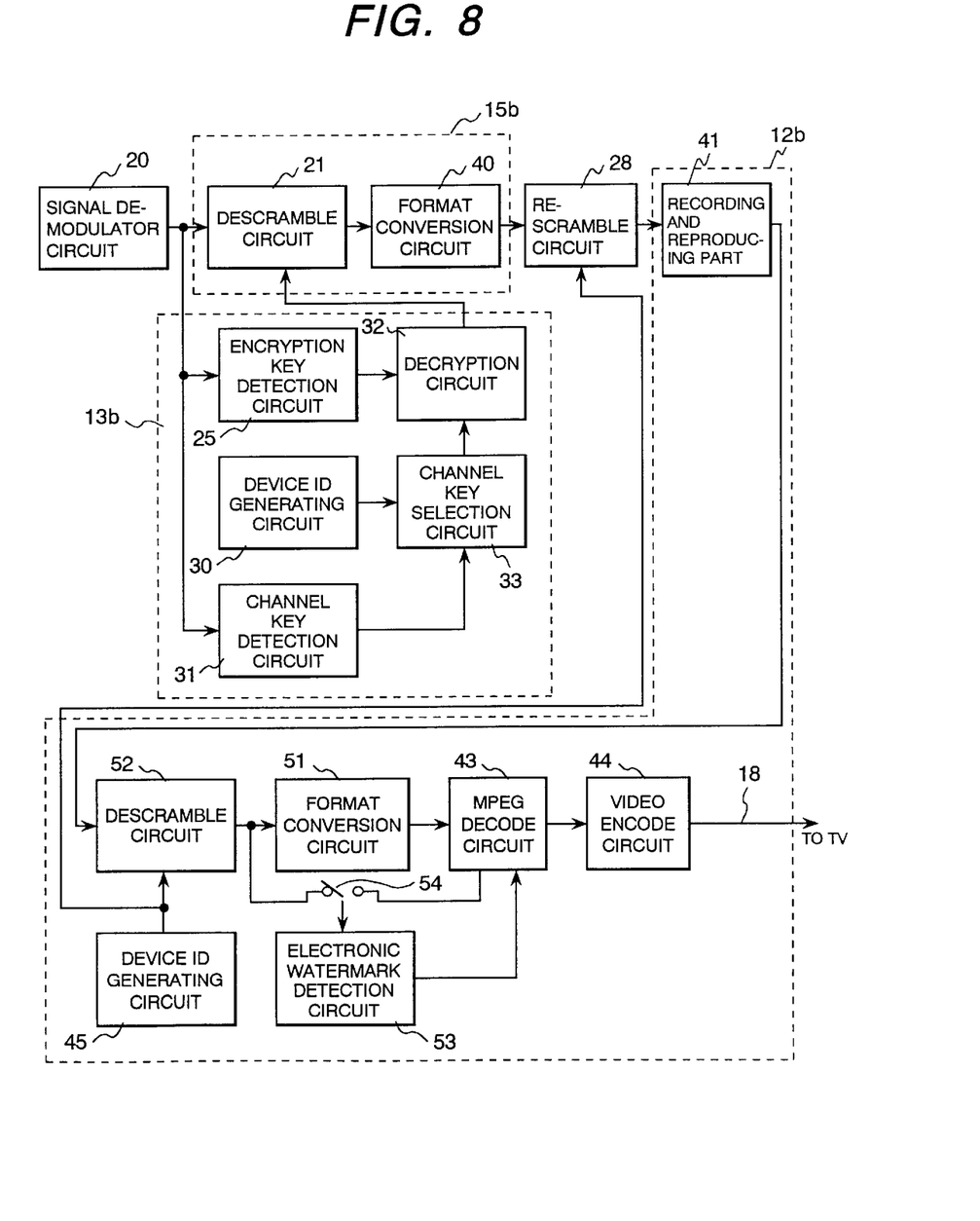
FIG. 8 is a block diagram illustrating still further embodiments of a receiving device and a recording and reproducing device according to the present invention.

FIG. 8 is a block diagram showing still further embodiments of a receiving device and a recording and reproducing device according to the present invention. In FIG. 8, blocks having the same functions as those in FIG. 7 are identified by the same reference numerals. A recording and reproducing device 12b comprises a recording and reproducing part 41, a de-rescramble circuit 52, a format conversion circuit 51, an MPEG decode circuit 43, a video encode circuit 44, a device ID generating circuit 45 and an electronic watermark detection circuit 53.

The format conversion circuit 51 performs the inverse of format conversion done by a format conversion circuit 40 upon recording. Incidentally, the following functions may be provided here as the functions of the format conversion circuit 51.

(1) Data from an STB 10 is converted to a format preferable to a recording medium.

(2) When the de-rescramble circuit 52 is not provided, the present circuit effects a different scramble on a signal after having been subjected to descrambling. In this case, the scramble is performed using some of a device ID signal inherent in the device.

Operation will be explained below with reference to the drawings.

A signal demodulated by a signal demodulator circuit 20 and descrambled by a descramble circuit 21 is inputted to a re-scramble circuit 28 where it is re-scrambled according to a device ID signal produced from the device ID generating circuit 45, followed by recording into the recording and reproducing part 41. Thus, an ID inherent in the device is also recorded together on a recording medium of the recording and reproducing part 41. On the other hand, electronic watermark information related to programs such as a program copyright a CGMS signal is electronically imbedded in the video signal outputted from the STB 10.

A signal outputted from the recording and reproducing part 41 is inputted to the descramble circuit 52 where it is descrambled according to a device ID signal outputted from the device ID generating circuit 45. Either of the video signal outputted from the descramble circuit 52 or a video signal outputted from the MPEG decode circuit 43 is selected by a switch 54 after which it is inputted to the electronic watermark detection circuit 53 by which an electronic watermark signal is detected. If the detected electronic watermark information indicates copy prohibition, then the electronic watermark detection circuit 50 inputs the signal to the MPEG decode circuit 43 regardless of attribute information, whereby the operation of the MPEG circuit is stopped. The video encode circuit 44 receives the output of the MPEG decode circuit 43 and converts it to a TV standard signal of NTSC or PAL or the like, which is there after outputted from a terminal 18.

Upon reproduction, the reproducing operation is controlled based on the two outputs, i.e., the device ID signal generated by the device ID generating circuit 45 and the output of the electronic watermark detection circuit 53. It is thus very difficult to reproduce the recording medium created by an illegal copying operation.

Figure 9:
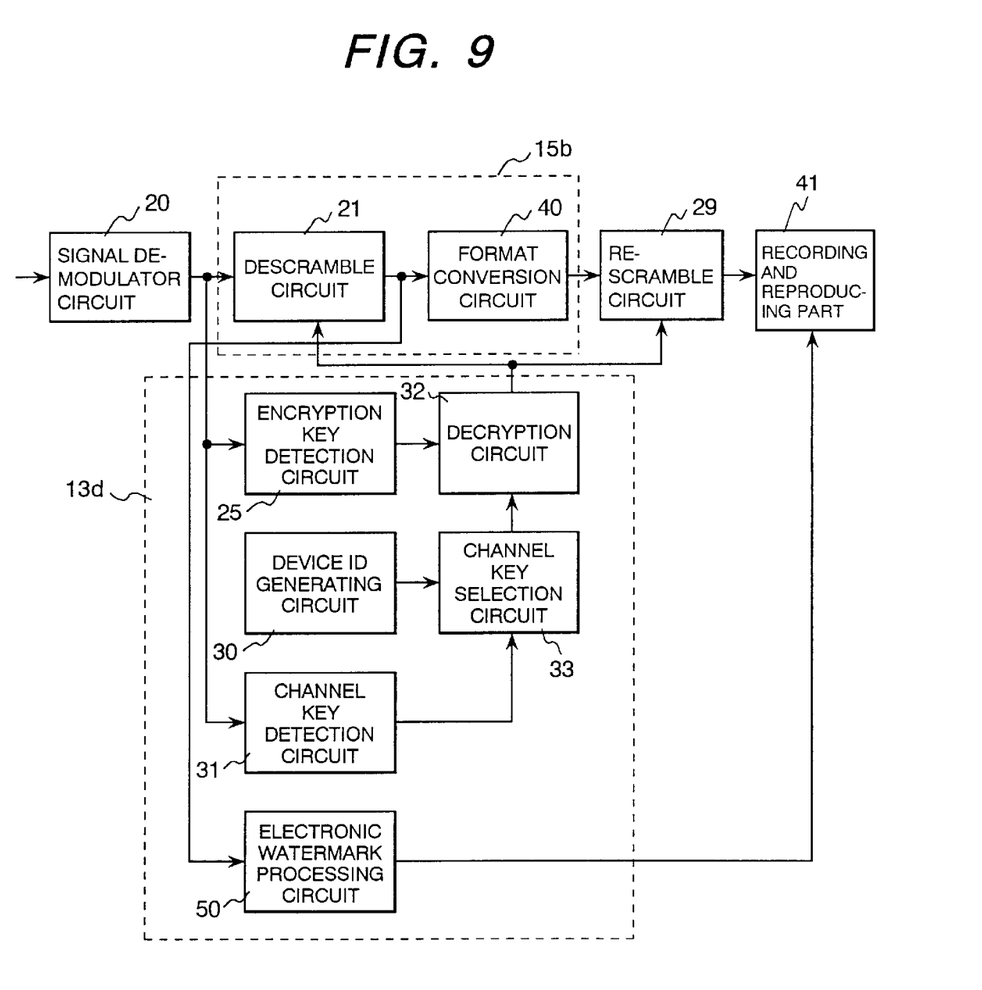
FIG. 9 is a block diagram depicting still further embodiments of a receiving device and a recording device according to the present invention.

FIG. 9 is a block diagram showing still further embodiments of a receiving device and a recording device according to the present invention. In FIG. 9, blocks having the same functions as those in FIGS. 3, 5 and 7 are identified by the same reference numerals. In the embodiments shown in FIG. 9, an attribute information identifying circuit 13d is provided with an electronic watermark processing circuit 50. The electronic watermark processing circuit 50 detects an electronic watermark signal to perform recording control.

As described using the embodiments shown in FIG. 5, a descramble circuit 21 unlocks or releases the scrambling of a received signal in accordance with a decryption key obtained from a decryption circuit 32. Further, a re-scramble circuit 29 effects scrambling on a signal whose format is converted by a format conversion circuit 40, by using this decryption key. The electronic watermark processing circuit 50 updates or changes a CGMS signal about electronic watermark information, which has been detected by the electronic watermark processing circuit 50, from once copy permission or approval to prohibition against any more copies upon recording and permits the recording of the signal into a recording and reproducing part 41 according to the signal changed to the copy prohibition. When the renewal of the CGMS signal about the electronic watermark information is not performed by the electronic watermark processing circuit 50 and the CGMS signal indicative of once copy permission is supplied to the recording and reproducing part 41, the recording is prohibited.

Since it is necessary to unlock or release the scrambling using the same key as the decryption key obtained from the decryption circuit 32 when the signal recorded in the recording and reproducing part 41 is reproduced, it is difficult to reproduce a recording medium by another recording and reproducing device.

Figure 10:
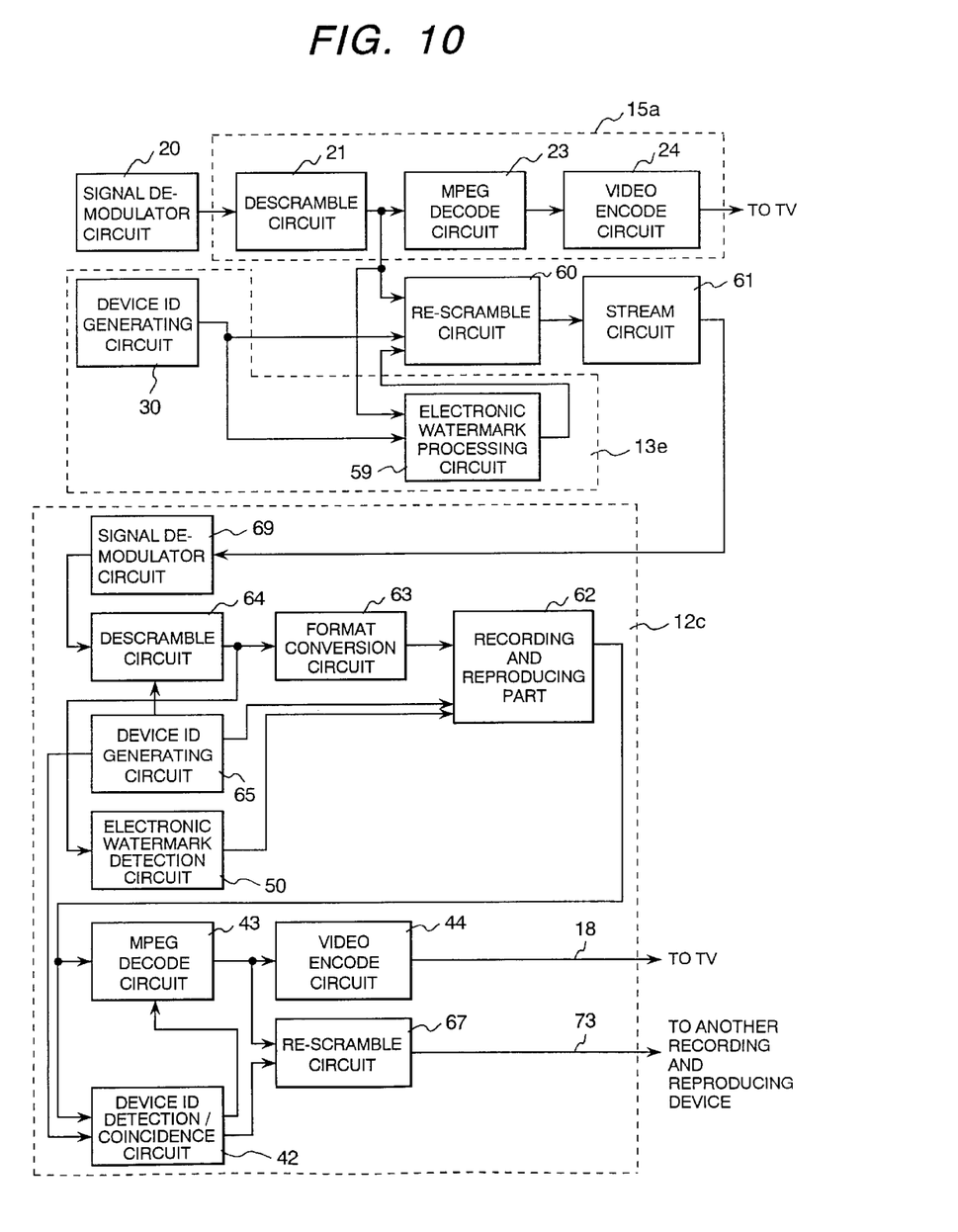
FIG. 10 is a block diagram showing still further embodiments of a receiving device and a recording and reproducing device according to the present invention.

FIG. 10 is a block diagram showing still further embodiments of a receiving device and a recording and reproducing device according to the present invention. In FIG. 10, blocks having the same functions as those in FIGS. 3, 5 and 7 are identified by the same reference numerals.

In the present embodiments, an attribute information identifying circuit 13e is provided with an electronic watermark processing circuit 59. A video signal descrambled by a descramble circuit 21 is supplied to a re-scramble processing circuit 60 and the electronic watermark processing circuit 59. Further, a device ID signal obtained from a device ID generating circuit 30 is supplied to a re-scramble circuit 60 and the electronic watermark processing circuit 59. The electronic watermark processing circuit 59 detects an electronic watermark signal from the video signal supplied from the descramble circuit 21 and updates or changes a CGMS signal (hereinafter called "watermark CGMS signal") indicative of the electronic watermark signal from once copy approval to prohibition against any more copies upon recording. Further, the electronic watermark processing circuit 59 adds the device ID signal supplied from the device ID generating circuit 30 to this signal. The re-scramble circuit 60 re-scrambles the video signal according to the device ID signal and superimposes the more-than-once copy prohibition signal and the device ID signal on the scrambled signal or changes some of the video signal based on the copy prohibition signal and the device ID signal and imbeds it in the video signal. The scrambled video signal, the copy prohibition signal and the device ID signal are outputted to a recording and reproducing device 12c through a stream circuit 61. The stream circuit 61 converts the signal outputted from the re-scramble circuit 60 to a stream and transmits it therefrom. The output of the stream circuit 61 is recorded in a recording and reproducing part 62 through a signal demodulator circuit 69, a descramble circuit 64 and a format conversion circuit 63 of the recording and reproducing device 12c.

The descramble circuit 64 unlocks the scrambling of the video signal according to a device ID signal obtained from a device ID generating circuit 65. Further, the present device ID signal is supplied to the recording and reproducing part 62. The recording and reproducing part 62 compares the device ID signal superimposed on or imbedded in the video signal with the generated ID signal. When they coincide with each other, a first condition for recording the video signal is met.

The descramble circuit 64 supplies the descrambled video signal to an electronic watermark detection circuit 50 where an electronic watermark CGMS signal superimposed on or imbedded in the video signal is detected and then supplied to the recording and reproducing part 62. When the electronic watermark CGMS signal is renewed or updated to the copy prohibition, the recording and reproducing part 62 permits recording. This is called a second condition. By meeting the two conditions, the video signal is recorded in a recording medium of the recording and reproducing part 62.

The video signal reproduced by the recording and reproducing part 62 is supplied to an MPEG decode circuit 43 and a device ID detection/coincidence circuit 42. Further, a device ID signal is supplied from the device ID generating circuit 65 to the device ID detection/coincidence circuit 42. The device ID detection/coincidence circuit 42 detects the electronic watermark CGMS signal from the video signal reproduced by the recording and reproducing part 62 and compares the electronic watermark CGMS signal with the device ID signal generated by the device ID generating circuit 65. The compared signal is supplied to the MPEG decode circuit 43. When the reproduced device ID signal and the reproduced device ID signal coincide with each other, the MPEG decode circuit 43 is activated. When they do not coincide with each other, the MPEG decode circuit 43 is deactivated. The output of the MPEG decode circuit 43 is encoded by a video encode circuit 44 and then outputted to a TV through a terminal 18. When the output of the MPEG decode circuit 43 is further recorded, a re-scramble circuit 67 re-scrambles the video signal outputted from the MPEG decode circuit 43 using the device ID signal obtained from the device ID detection/coincidence circuit 42 and thereafter outputs the re-scrambled signal to another recording and reproducing device through a terminal 73.

Figure 11:
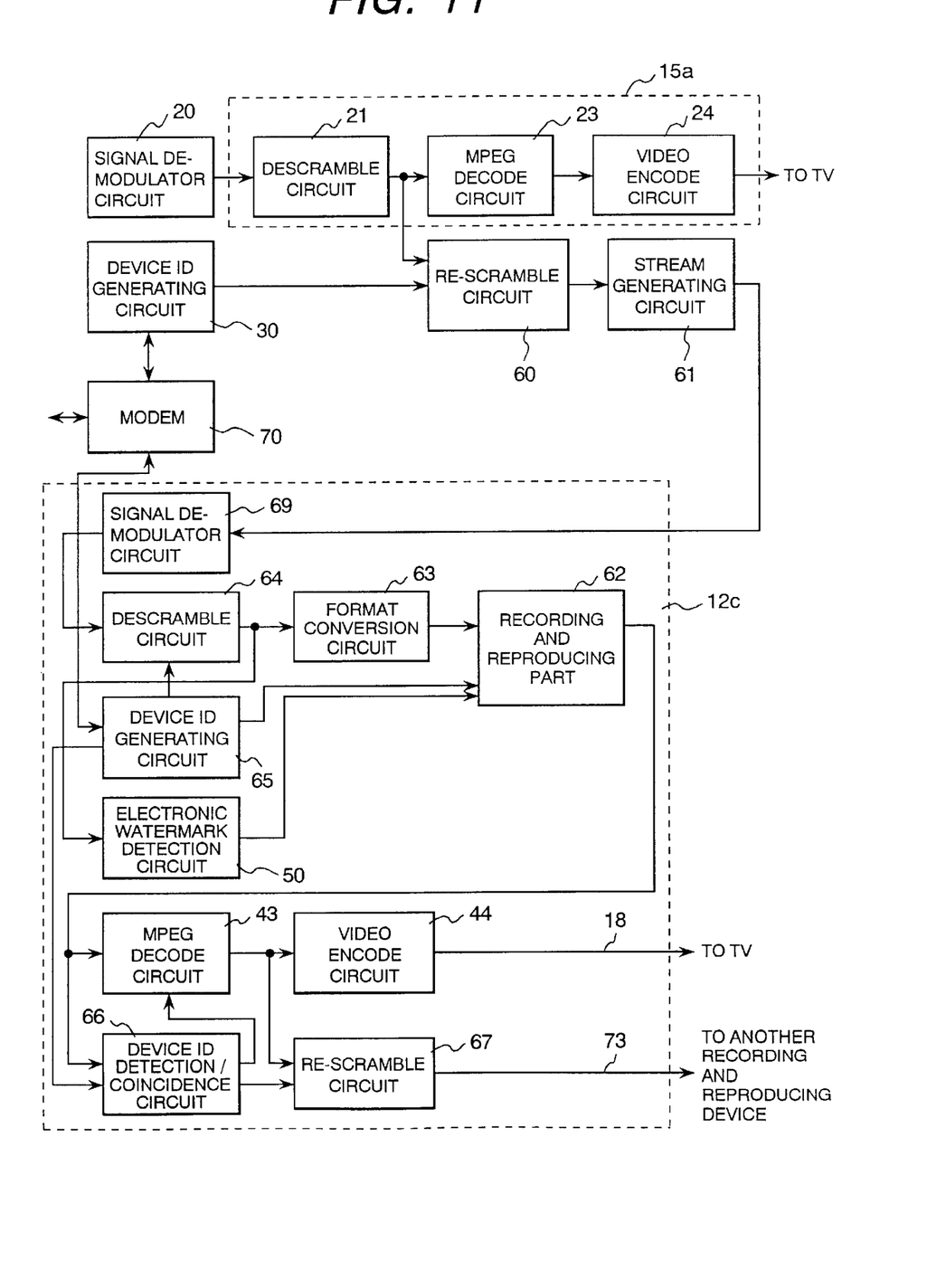
FIG. 11 is a block diagram illustrating still further embodiments of a receiving device and a recording and reproducing device according to the present invention.

FIG. 11 is a block diagram showing still further embodiments of a receiving device and a recording and reproducing device according to the present invention. In FIG. 11, blocks having the same functions as those in FIG. 10 are identified by the same reference numerals. In FIG. 11, there is provided a modem 70, which obtains a device ID signal and a decryption key through a telephone line.

There is a possibility that where the device ID signal is held in the device, it will be easily decrypted if the device is analyzed. There may be cases in which it is desired to change the type of decryption key according to programs. This case provides or offers an advantage in terms of the retention of secrete if the device ID signal and decryption codes or identification information are obtained using the telephone line. In the present embodiments, the device ID signal is obtained by using the modem connected to the telephone line and supplied to device ID generating circuits 30 and 65. In the present embodiments, the device ID signal and the decryption codes are obtained after the code of the device is sent out to specify the device. Based on these, decryption keys are transmitted to a descramble circuit 64 and a re-scramble circuit 60 to perform decoding and re-scrambling. Of course, crypto processing is generally effected on the decryption keys obtained here by using identification codes.

According to the present invention, crypto processing or recording control can be performed based on attribute information and a device ID signal sent along with programs, so that copy management can be realized.

More effective copy management can be performed by effecting crypto processing on a signal outputted from an STB using an attribute signal in particular.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A receiving device, comprising:
   a signal demodulator circuit for demodulating an encrypted video signal and attribute information including an encryption key and a channel key indicative of each broadcast channel;
   a channel key detection circuit for detecting a channel key from the attribute information;
   an encryption key detection circuit for detecting an encryption key from the attribute information;
   a device ID generating circuit for generating a unique device ID signal;
   a channel key selection circuit for selecting a channel key for a receivable channel according to the device ID signal and the channel key from the channel key detection antenna and outputting the selected channel key;
   a decryption circuit for outputting a decryption key from the channel key outputted from said channel key selection circuit and the encryption key; and
   a descramble circuit for unscrambling the video signal obtained from said signal demodulator circuit by using the decryption key, and
   wherein the output of said descramble circuit is outputted for recording.

2. A receiving device, comprising:
   a signal demodulator circuit for demodulating an encrypted video signal and attribute information including information for decoding an encryption;
   an attribute information identifying circuit for identifying and outputting the attribute information; and
   a descramble circuit for descrambling the video signal obtained from said signal demodulator circuit according to the output obtained from said attribute information identifying circuit, and
   wherein the output of said descramble circuit is outputted for recording; and
   wherein the receiving device further includes an electronic watermark, which is embedded in the video signal, processing circuit, and wherein a CGMS signal, which is superimposed in a vertical blocking area, obtained from said electronic watermark processing circuit is outputted to a recording device to control copying of said recording device.

3. A receiving device, comprising:
   a signal demodulator circuit for demodulating an encrypted video signal and attribute information including each encryption key and each channel key indicative of a broadcast channel;
   a channel key detection circuit for detecting a channel key from the attribute information;
   an encryption key detection circuit for detecting an encryption key from the attribute information;
   a device ID generating circuit for generating a unique device ID signal;
   a channel key selection circuit for selecting a channel key for a receivable channel according to the device ID signal and the channel key from the channel key detection circuit and outputting the same therefrom;
   a decryption circuit for outputting a decryption key from the channel key outputted from said channel key selection circuit and the encryption key;
   a descramble circuit for unlocking the scramble of the video signal obtained from said signal demodulator circuit, based on the decryption key; and
   a re-scramble circuit for re-scrambling the descrambled video signal using the encryption key, and
   wherein the output of said re-scramble circuit is outputted for recording.

4. The receiving device according to claim 3, further including a format conversion circuit for converting the descrambled video signal into a format which matches with a recording medium to record the video signal thereon; wherein said re-scramble circuit re-scrambles the output of said format conversion circuit.

5. A receiving device, comprising:
   a signal demodulator circuit for demodulating an encrypted video signal and attribute information including each encryption key and each channel key indicative of a broadcast channel;
   a channel key detection circuit for detecting a channel key from the attribute information;
   an encryption key detection circuit for detecting an encryption key from the attribute information;
   a device ID generating circuit for generating a unique device ID signal;
   a channel key selection circuit for selecting a channel key for a receivable channel channel according to the device ID signal and the channel key from the channel key detection circuit and outputting the same therefrom;
   a decryption circuit for outputting a decryption key from the channel key outputted from said channel key selection circuit and the encryption key;
   a descramble circuit for unscrambling the video signal obtained from said signal demodulator circuit, based on the decryption key; and
   a re-scramble circuit for re-scrambling the descrambled video signal,
   wherein the output of said re-scramble circuit is outputted for recording.

* * * * *